US006449767B1

United States Patent
Krapf et al.

(10) Patent No.: US 6,449,767 B1
(45) Date of Patent: Sep. 10, 2002

(54) SYSTEM FOR DISPLAYING AN INTEGRATED PORTAL SCREEN

(75) Inventors: Russell M. Krapf, Dana Point; Bradley S. Masters, Mission Viejo, both of CA (US)

(73) Assignee: Keen Personal Media, Inc., Irvine, CA (US)

( * ) Notice: Subject to any disclaimer, the term of this patent is extended or adjusted under 35 U.S.C. 154(b) by 0 days.

(21) Appl. No.: 09/608,104

(22) Filed: Jun. 30, 2000

(51) Int. Cl.[7] .......................... H04N 5/445; H04N 7/173
(52) U.S. Cl. .......................... 725/110; 725/110; 725/34; 725/141
(58) Field of Search .............................. 725/37, 40, 43, 725/45, 46, 49, 110, 109, 112, 113, 34, 141, 38; 348/563, 564, 565, 731; H04N 7/16, 7/173

(56) References Cited

U.S. PATENT DOCUMENTS 5,583,560 A * 12/1996 Florin et al. .................. 348/7
5,977,964 A * 11/1999 Williams et al. ............. 345/27
6,182,287 B1 * 1/2001 Schneidewend et al. ...... 725/48

OTHER PUBLICATIONS

METABYTE Technology, "The MbTV core Technology consists of a Preference Determination Engine and a Storage Management Engine", printed Oct. 2, 2000 from http://www.mbtv.com/technology.htm.*
METABYTE Products and Services Personalized Television, printed Oct. 2, 2000 from http://www.mbtv.com/ptv.htm.*
METABYTE Products and Services Digital VCR, printed Oct. 2, 2000 from http://www.mbtv.com/digital_vct.htm.*
TIVO Tour and Demo, printed Oct. 2, 2000 from http://www.tivo.com/what/tour.html.*
METABYTE Preference Determination Engine, printed Oct. 2, 2000 from http://www.mbtv.com/pde.htm.*

* cited by examiner

Primary Examiner—Chris Grant
(74) Attorney, Agent, or Firm—Milad G Shara, Esq.

(57) ABSTRACT

A control device for a system for displaying video data includes an output port configured to couple to the video display and input ports configured to couple to a plurality of sources for display content. An image generator is coupled to the input ports and the output port and generates a portal image to be displayed on the video display as a personalized portal screen. The personalized portal screen has a plurality of integrated display options personalized to a viewer's preferences. Each display option corresponds to one of the sources for display content or content within one of the sources. The display options include viewports that display content from selected sources and further including links to other sources.

14 Claims, 4 Drawing Sheets

SYSTEM FOR DISPLAYING AN INTEGRATED PORTAL SCREEN

BACKGROUND OF THE INVENTION

1. Field of the Invention

The invention relates to a system for displaying video data. More particularly, the invention relates to a system and a method for displaying video data that allow a viewer to personalize the display.

2. Description of the Related Art

A conventional system for displaying video data includes a monitor or a television (TV) set connected to a set top box. The set top box is connected through a coaxial cable to a cable TV network or a satellite dish for "satellite TV." The TV set and the set top box are located, for example, in a viewer's home and receive a multitude of TV channels from a broadcast head end, wherein each TV channel has a multitude of programs during a typical day. In order to select and watch a certain program, the viewer usually uses a remote control to control at least the set top box to tune to a desired channel. The TV set receives a video signal from the set top box and displays the program of the desired channel.

Depending on how the system is configured, the viewer can activate the set top box and the TV set separately, or activate only the set top box, which then activates the TV set. If the viewer turns the set top box off after a viewing session, the set top box tunes to a default channel when the viewer turns the set top box on again. The default channel may be the last channel the viewer watched during a previous viewing session, or a pre-selected channel tuned to a head end start-up channel. Other viewers may prefer leaving the set top box always on and turning only the TV set on and off. Thus, when a viewer turns on the TV set, the TV set displays as the default channel the last channel the viewer watched.

A viewer may expand the system by connecting a video recorder between the TV set and the set top box in order to overcome the rigid scheme according to which the programs are broadcast. A viewer, thus, can personalize television viewing by recording a program and watching it when it is convenient for the viewer. The video recorder may be a digital video recorder that includes a hard disk drive with a storage capacity of between 10 GB and 30 GB for recording of up to 30 hours of television programming.

In addition to using a video recorder, alternative systems provide for even more flexibility and viewer-specific television. For example, the digital video recorders (also referred to as personal video recorders) offered by Replay Networks in combination with ReplayTV service and offered by Philips in combination with TiVo service allow the viewer to personalize television viewing. For instance, the personal video recorder can learn a viewer's preferred programs and automatically record programs it expects a viewer to like. The viewer can also, among other activities, watch and pause live TV. That is, the viewer can pause a favorite show when someone calls and pick up the show again exactly where the viewer left off.

Furthermore, the system may be configured to access and obtain content from the Internet via a cable modem, a digital subscriber line (DSL) modem, or a telephone/fax modem, which may be external devices or a part of the set top box. The content obtained from the Internet is then routed to the video display through the set top box. Such a system, for example, provided by "WebTV," combines the function of Internet access and the function of broadcast channel access.

Although such systems provide for a certain degree of personalized television, the viewer is presented with different interfaces for each form of content. Further, the consumer may have to wade through several levels of screens and menus to arrive at his specific favorite content choices. There is therefore a need to improve upon the prior art technique for displaying video data so that television and content presentation is even more personalized and simplified.

SUMMARY OF THE INVENTION

The present invention may be regarded as a control device for a video display. The control device includes an output port configured to couple to the video display and input ports configured to couple to a plurality of sources for display content. An image generator is coupled to the input ports and the output port and generates a portal image to be displayed on the video display as a personalized portal screen. The personalized portal screen comprises a plurality of integrated display options personalized to a viewer's preferences. Each display option corresponds to one of the sources for display content. The display options include viewports that display video content from selected sources for display content and further include links to other sources.

Further, the present invention may be regarded as a method of controlling a video display. The method scans input ports to determine available sources for display content and determines a plurality of display options based upon viewer preferences. The method generates a portal image to be displayed on the video display as a personalized portal screen, wherein the personalized portal screen comprises the display options and wherein each display option corresponds to content available from one of the available sources or specific subcontent within the available sources for display content. The display options include viewports that display content from selected sources for display content and further include links to other sources.

The present invention thus provides for an integration of the functions for Internet and broadcast channel access. In addition, the present invention integrates these functions in a single viewer-based and time-based preference navigation system.

BRIEF DESCRIPTION OF THE DRAWINGS

These and other aspects, advantages, and novel features of the invention will become apparent upon reading the following detailed description and upon reference to the accompanying drawings. In the drawings, same elements have the same reference numerals.

FIG. 3 schematically illustrates an exemplary embodiment of a control device included in the system of FIG. 1 that is coupled to a plurality of sources for display content, and that includes an image generator that generates a portal image to be displayed as the personalized portal screen.

Figure 4:
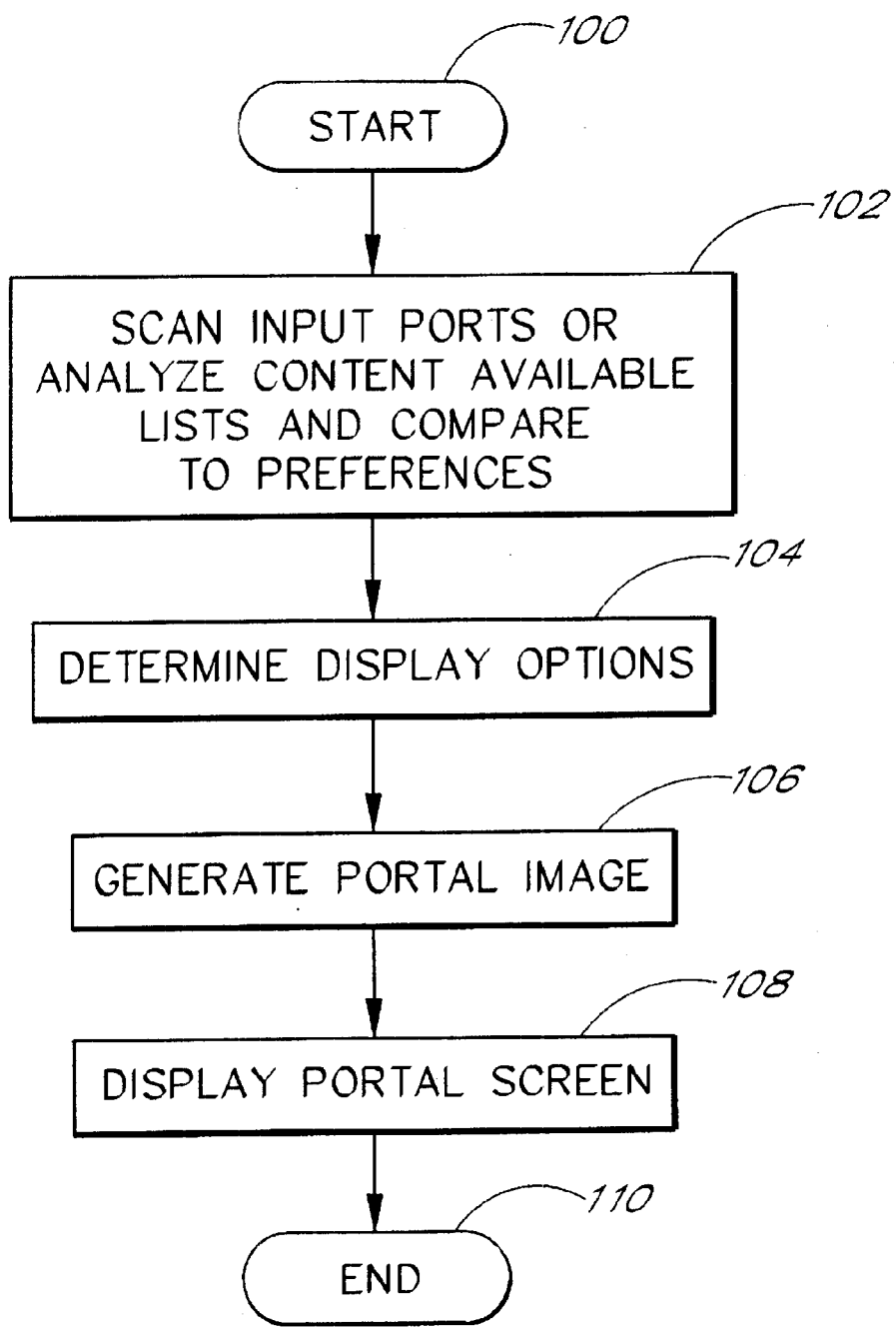

FIG. 4 is a flow chart of a method in accordance with an embodiment of the present invention that generates and displays the personalized portal screen on the display.

DETAILED DESCRIPTION OF THE PREFERRED EMBODIMENT

Figure 1:
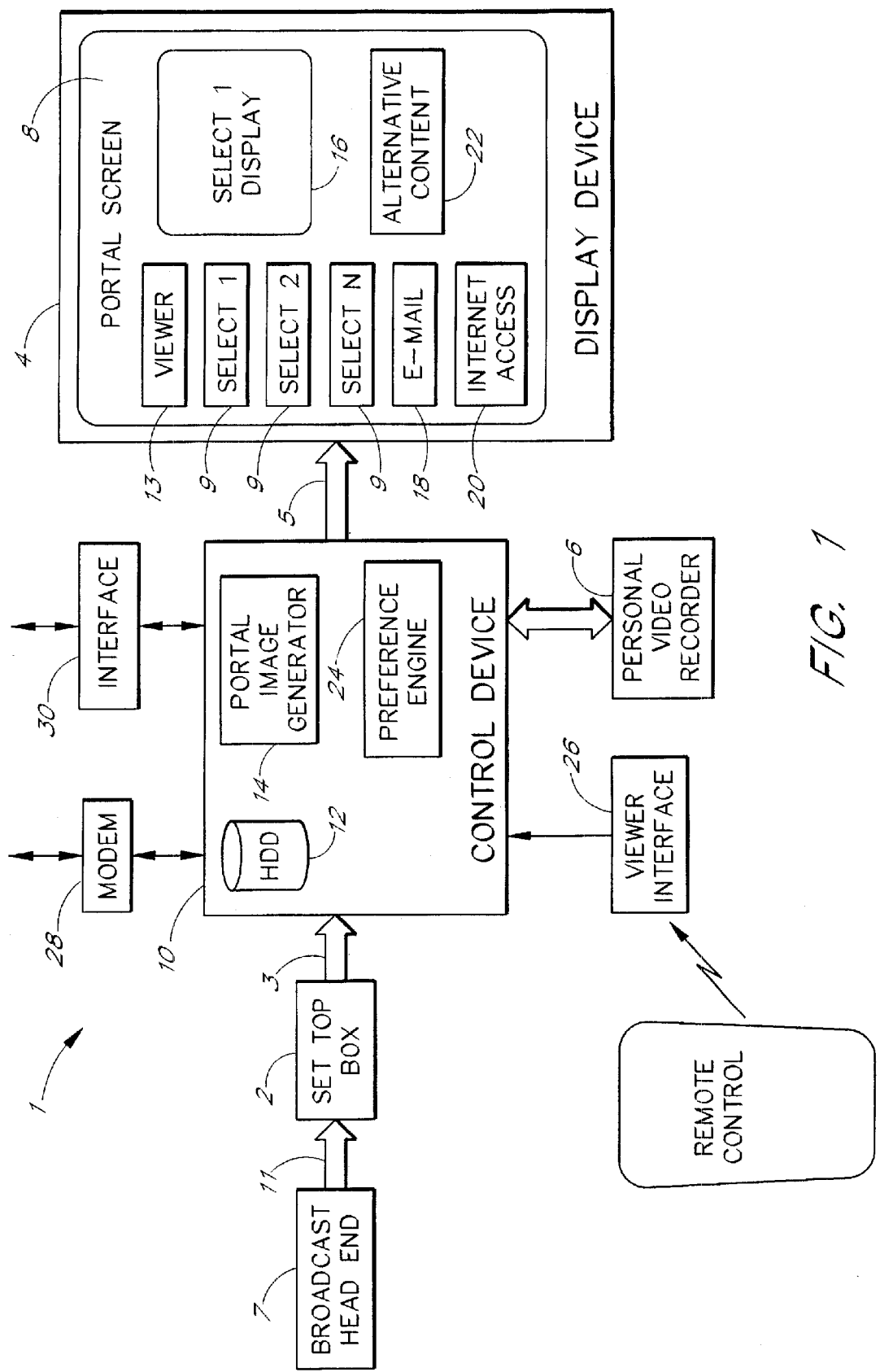
FIG. 1 shows a system for displaying video data in accordance with an embodiment of the present invention that includes a set top box and a control device connected to a display for displaying a personalized portal screen, wherein the control device is coupled to a plurality of sources for display content, and wherein the personalized portal screen has a plurality of integrated display options personalized to a viewer's preferences, wherein each display option corresponds to one of the sources for display content.

FIG. 1 shows an embodiment of a system 1 for displaying video data in accordance with an embodiment of the present invention. The system 1 includes a set top box 2, a display 4 and a control device 10, which are usually located within a viewer's home. A cable 11 connects the set top box 2 to a satellite dish for satellite TV or to a remotely located broadcast head end 7, as shown in FIG. 1, which may be a part of a cable TV network. A line 3 connects the set top box 2 and the control device 10, and a line 5 connects the control device 10 to the display 4.

The illustrated system 1 further includes a plurality of sources for display content, which, in one embodiment, are connected to input ports of the control device 10. For example, a modem 28, a network interface 30, a viewer interface 26 and a personal video recorder 6 are connected to the control device 10. The set top box 2 is also considered a source for display content, namely for broadcast content, wherein a tuner of the set top box 2 selects one of the channels provided by the broadcast head end 7. In an alternative embodiment, these sources for display content, or their functionalities, may be integrated into the control device 10. The modem 28 may be a cable modem, a DSL modem or a telephone/fax modem in order to access the Internet. The network interface 30 may be a network card to connect to a computer network, for example, a local area network or a wide area network. The viewer interface 26 allows the viewer to control the system 1, for example, via the control device 10 and may be configured to receive control signals from a remote control 32, to connect to a keyboard, a mouse, a voice command recognition system, or the like.

The personal video recorder 6 includes a storage device, such as a hard disk drive (HDD) with a storage capacity of greater than 10 GB to selectively store and, thus, record video content in digital form. The storage device may store 10 hours or more of compressed video and audio data. The compression is often achieved by using a standardized process defined by the Moving Picture Expert Group (MPEG), e.g., MPEG-2. The personal video recorder 6 may be connected through a communications bus, e.g., a universal serial bus (USB), and appropriate interface circuits.

The display 4 may be a TV, a computer monitor or any other display to display a personalized portal screen 8. As described below in greater detail, the personalized portal screen 8 includes a menu that includes a plurality of display options, wherein the content from various sources for display content (2, 6, 28, 30) are included in the display options. Among others, the menu includes several display preferences 9, which the viewer may select at the beginning of or during a viewing session. These display preferences 9, for example, broadcast content, broadcast channels or video content from the personal video recorder 6, are illustrated as SELECT 1, SELECT 2, . . . SELECT N within the personalized portal screen 8. Other display options are represented through boxes 18, 20 and 22, wherein the box 18 illustrates e-mail access, the box 20 illustrates Internet content access, and the box 22 illustrates an alternative content, for example, an advertisement.

As illustrated, a section of the personalized portal screen 8 is a viewport 16 that shows one of the display options in reduced size. By selecting the viewport 16, the viewer may enlarge the viewport 16. In an alternative embodiment, each display option may have a separate viewport that displays the display content from the respective source for display content. In addition, the menu indicates the viewer, for example, a family member for whom this menu is created. The viewer may be indicated by a real or artificial name that appears in a box 13. Furthermore, the display options may include links to other sources for display content. For instance, an advertisement in the box 22 may display a link to a Website that offers additional information or purchase options.

The broadcast head end 7 provides broadcast video data that includes a multitude of channels with a multitude of programs having audio and video data. The broadcast head end 7 may further enable the viewer to subscribe to and receive video-on-demand or pay-per-view services that provide premium content. The format of the broadcast video data may be in accordance with known video/television formats such as NTSC, PAL, or the like.

The control device 10 includes a storage device 12, a portal image generator 14 and a preference engine 24. The preference engine 24 is a software module configured to learn a viewer's watching preferences by tracking the viewer's viewing pattern. The preference engine 24 uses the viewing pattern to create a viewer profile. The preference engine 24 can create viewer profiles for more than one viewer, for example, for each family member. Thus, the viewer-specific viewer profile represents the contents and channels this viewer prefers and on which day and at what time of the day this viewer watches the content. In one embodiment, the preference engine is a software module that is commercially available from Metabyte Networks, Inc.

The storage device 12 may be a hard disk drive (OMD) that stores data representing the viewers viewing preferences and viewing patterns. For example, the viewing preferences, and thus the display preferences 9, may be categorized based on broadcast content, such as sports, entertainment, news, and movies, or based on sources for certain viewing preferences, such as preferred TV channels including pay-per view channels and video-on-demand channels. In addition, the viewing preferences may include other categories such as advertising, infomercials, catalogs, or Internet content, which is accessible via the modem 28. The control device 10 may update the viewing preferences depending on the viewer's actual preferences or, for example, depending on whether or not it is the season for a certain sports event. The control device 10, therefore, enables the personalized portal screen 8 to have a "learning" capability for adjusting to each viewer's viewing preferences.

The portal image generator 14 may access the storage device 12 and retrieve one of several stored viewing preferences to generate a portal image, preferable a digital portal image, that is the basis for the personalized portal screen 8. The portal image generator 14 retrieves the viewing preferences of that viewer, e.g., a member of a family, the control device 10 determined to be the most likely viewer at this day and that time of day. The control device 10 therefore estimates who is the most likely viewer based on the stored viewing profile.

The various categories of the viewing preferences, all or only a selection thereof, appear as the display preferences 9 within the personalized portal screen 8. The portal image generator 14 generates a new and updated image, for example, every time the viewer turns the display 4 on. In addition, the portal image generator 14 generates the boxes 13, 18, 20, 22 depending on what sources are available and depending on the day and the time of the day. For example, the control device 10 may determine that it is very likely the mother of the family when the display 4 is turned on at 10 a.m. on a weekday, and that it is very likely a child of the family when the display 4 is turned on at 9 a.m. on a Saturday. The portal image generator 14 accordingly inserts "Mother" or "Child" into the box 13.

The system 1 in accordance with the present invention therefore displays the personalized portal screen 8 as a default screen whenever a viewer initiates a new viewing session. Hereinafter, it is assumed that the set top box 2 is always on, and the status of the display 4, i.e., "ON" or "OFF," is a viewer-determined variable. Thus, as soon as the display 4 is turned on, the viewer immediately sees the personalized portal screen 8 with its display options. The menu of the personalized portal screen 8 directly guides the viewer to a preferred program, content or source of content without the need to study a voluminous program guide and without the inconvenience of first "zapping" through a variety of channels to find a preferred content.

Moreover, the system 1 presents the viewer a single interface for a plurality of sources for display content and provides for an integration of multiple functions, for example, Internet access and broadcast channel access. In addition, the present invention integrates these functions in a single viewer-based and time-based preference navigation system. This obviates the need to wade through several levels of screens and menus so that it is easier for the viewer to operate the system 1.

Figure 2:
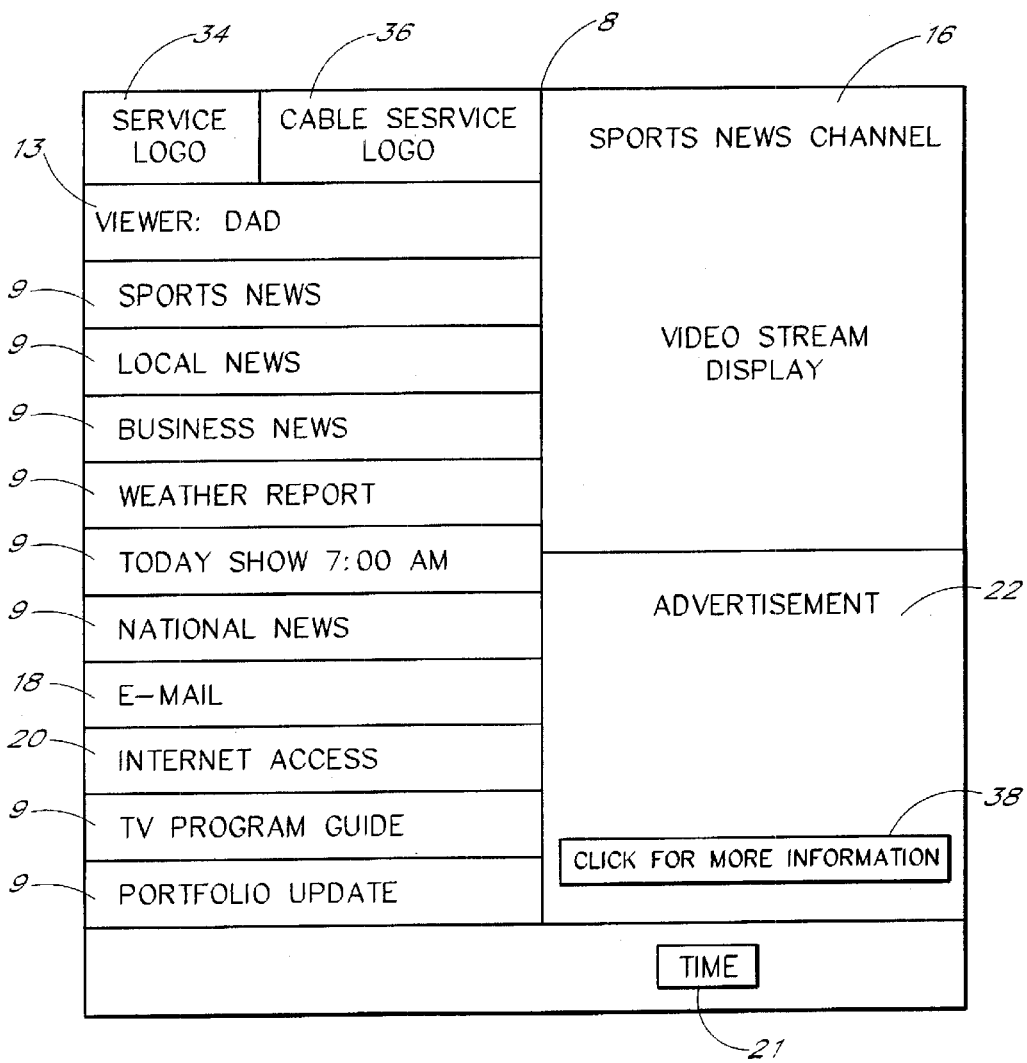
FIG. 2 shows an embodiment of the personalized portal screen that includes the display options of a specific viewer, wherein a section of the personalized portal screen displays a video stream for a preferred display option and another section of the personalized portal screen displays advertisement directed to the specific viewer.

FIG. 2 shows an embodiment of the personalized portal screen 8 that includes the display options of a specific viewer. In the illustrated personalized portal screen 8 the viewer is Dad as represented in the box 13. The display options include the viewing preferences 9, which are categorized by content (Sports News, Local News, Business News, Weather Report, National News, Portfolio Update) or channel (Today Show, TV Program Guide), or the sources for display content (E-mail, Internet Access). As illustrated in FIG. 2, the viewport 16 shows the sports news channel because it may be the preferred content of the viewer Dad at this day and at this time of the day. The alternative content 22 is illustrated as an advertisement, for example, a banner or a trailer, selected by the preference engine 24 for the viewer Dad. Upon clicking a box 38, the viewer may request more information about the currently advertised product or service. The personalized portal screen 8 may also show the time in box 21. Other boxes 34, 36 indicate a logo of an Internet service and a logo of a cable TV service, respectively.

Figure 3:
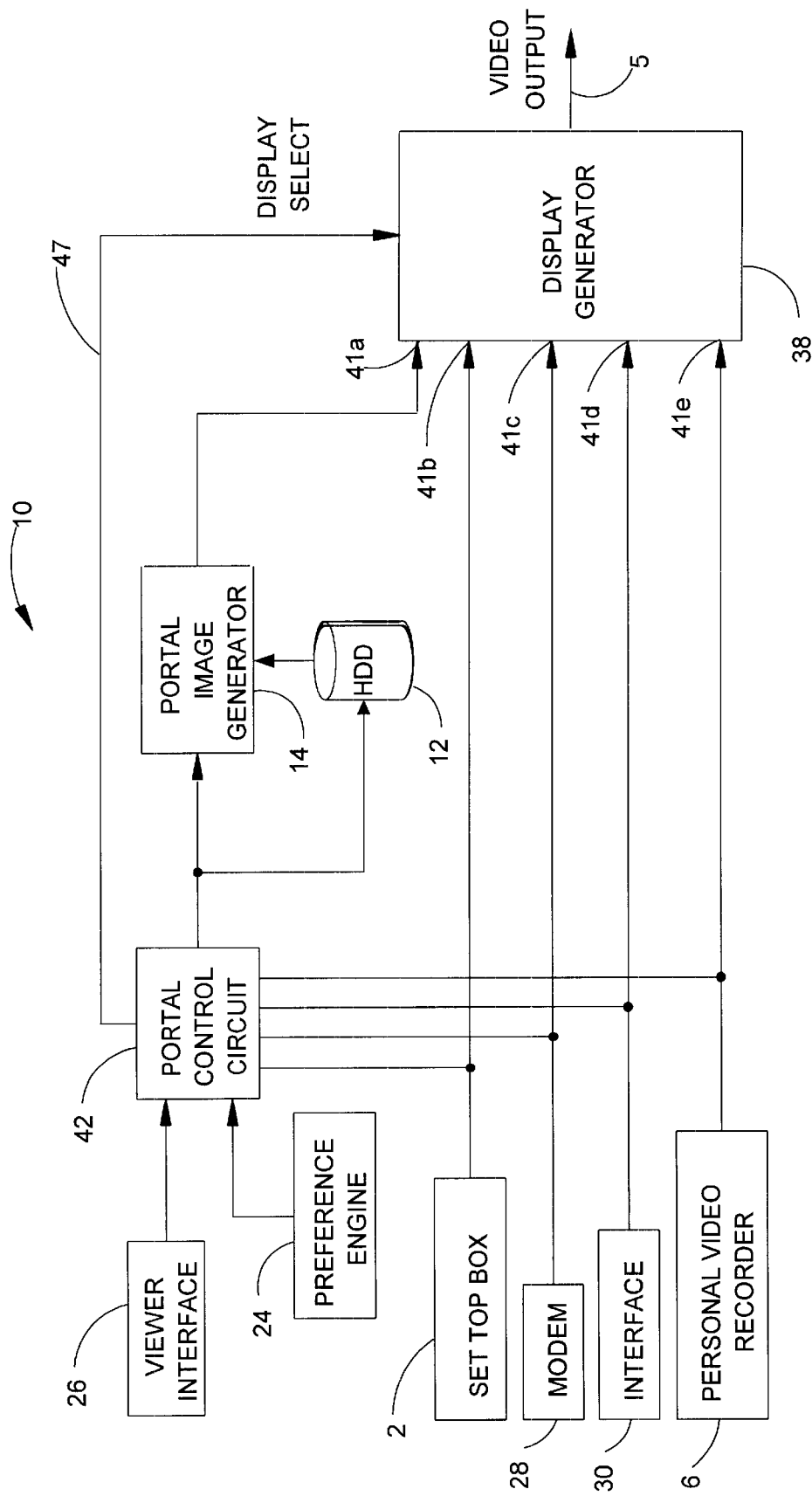

FIG. 3 schematically illustrates an exemplary embodiment of the control device 10 included in the system 1 of FIG. 1. As illustrated, the control device 10 is coupled to a plurality of sources for display content, namely the set top box 2, the modem 28, the network interface 30, and the personal video recorder 6. In addition to the components described with reference to FIG. 1 (i.e., the storage device 12, the portal image generator 14 and the preference engine 24), the control device 10 includes a portal control circuit 42 and a display generator 38. The portal control circuit 42 generally controls the operation of the control device 10 in accordance with the present invention. The portal control circuit 42 is connected to the set top box 2, the modem 28, the network interface 30, the personal video recorder 6, the viewer interface, the storage device 12, the portal image generator 14 and the preference engine 24. The portal image generator 14, the set top box 2, the modem 28, the network interface 30 and the personal video recorder 6 are connected to inputs 41a, 41b, 41c, 41d, 41e, respectively, of the display generator 38. An output of the display generator 38, indicated as VIDEO OUTPUT, is connected to the line 5 which is connected to the display 4.

As described above, the storage device 12 stores data representing the viewer's viewing preferences. When the portal control circuit 42 activates the portal image generator 14, the portal control circuit 42 also enables the portal image generator 14 to access and retrieve data from the storage device 12. The portal control circuit 42 further controls the storage device 12 to enable the storage device 12 to store new data to update the data stored on the storage device 12. For instance, the preference engine 24 may be associated with the storage device 12 and may update the data under control of the portal control circuit 42.

The portal image generator 14 retrieves the data for the present viewer from the storage device 12 and generates the digital portal image that forms the basis of the personalized portal screen 8. The portal image generator 14 "builds" the digital portal image in accordance with conventional techniques.

The display generator 38 is connected via the input 41a to the portal image generator 14 and receives the digital portal image from the portal image generator 14. The display generator 38 converts this digital portal image into a signal format that can be displayed on the display 4. For example, the signal format may be in accordance with known video/television formats such as NTSC, PAL, or the like. The display generator 38 outputs the generated signal to the line 5.

The display generator also selectively connects one of the other inputs 41b, 41c, 41d, 41e to the VIDEO OUTPUT on the line 5 in response to a DISPLAY SELECT control signal on a line 47 connected to the portal control circuit 42. When the viewer turns the display 4 on, the portal control circuit 42 selects the input 41a that connects the output of the portal image generator 14 to the display generator 38 so that the display 4 can receive the signal generated by the portal image generator 14 and display it as the personalized portal screen 8. Once the viewer selects one of the display options, the preferences 9 or the sources for display content 18, 20, from the personalized portal screen 8, the portal control circuit 42 selects one of the other inputs 41b, 41c, 41d, 41e to couple one of the sources (2, 6, 28, 30) to the display 4.

FIG. 4 is a flow chart of a procedure illustrating the method in accordance with the present invention. The method provides for the display of the personalized portal screen 8 on the display 4 when a viewer initiates a viewing session. The method provides that whenever a viewer turns the display 4 on, this viewer sees the personalized portal screen 8 and its display options generated for this viewer.

In a step 100, the procedure initializes the system 1 and executes routine procedures to determine whether the system 1 is operating. Further, the routine procedures assess the stored viewing preferences and determine the available storage capacity of the storage device 12.

In a step 102, the procedure scans the input ports of the control device 10 or analyzes the content available lists to determine the number and kind of sources the system 1 includes and to determine the content available from the sources. That is, the procedure registers the set top box 2, the modem 28, the network interface 30 and the personal video recorder 6 as the available sources for display content. The procedure also analyzes content available lists (e.g., an electronic program guide) to determine what content is available from the sources. The procedure may also determine whether these sources are active and operating properly. If a connected source fails, the procedure generates an error message. The procedure compares the sources and the content available to the viewing preferences in the viewer profiles.

In a step 104, the procedure determines the available display options based on the scanning and testing executed in the step 102. Each available display option will be represented on the personalized portal screen 8 so that the viewer sees all display options on a single menu.

In a step 106, the procedure generates the portal image. The portal control circuit 42 enables access to the storage device 12 and controls the portal image generator 14 to retrieve data from the storage device 12. The portal image generator 14 uses this data to generate the digital portal image. As discussed above, the data represents the viewer profile of the viewer the system 1 detected as the most likely viewer at this day and this time of the day. In addition, the portal image generator 14 adds the available display options to the portal image.

In a step 108, the procedure displays the generated digital portal image as the personalized portal screen 8. The procedure converts the digital image, for example, into a NTSC signal that the display 4 shows as the personalized portal screen 8. FIG. 2 shows an exemplary personalized portal screen 8. The procedure ends at a step 110.

In one embodiment, the modem 52 allows the system 1 to automatically access a remote data source or the internet and to update the content of the storage device 12 of the control device 10. Further, the modem capability of the system 1 may be represented as one of the display preferences 9 on the personalized portal screen 8. Upon initiating a viewing session, the viewer can select the internet and its multitude of web sites as a display option and to surf the Web.

As discussed above, the viewer controls at least the set top box 2 through the remote control 6. As illustrated in FIG. 1 by way of example, the remote control 6 communicates with the personal video recorder 2 via a wireless link that conveys control signals using infrared (IR) light or other transmission means. Remote controls and their various functions are generally known in the art. In one embodiment the viewer uses the remote control to select one of the display options of the personalized portal screen 8. The control device 10 processes the viewer's selection and controls the system 1 appropriately.

Those skilled in the art will appreciate that the functionalities of the set top box 2, the personal video recorder 6, the modem 28 and the network interface 30, and the control device 10 may be integrated into one housing and that, for example, the personal video recorder 6 and the control device 10 may share one storage device 12 having an appropriate storage capacity to store compressed video data and the viewing preferences. It should be further understood that the display device 4 may also be incorporated into the one housing.

What is claimed is:

1. A control device for a video display, comprising:

an output port configured to couple to a video display;

input ports configured to couple to a plurality of sources for display content; and an image generator coupled to the input ports and the output port and configured to generate a portal image to be displayed on the video display as a portal screen, the portal screen comprising a plurality of integrated display options personalized to a viewer's preferences, each display option corresponding to one of the sources or content from one of the sources, the display options including viewports that display content from selected sources for display content, the display options further including links to other sources.

2. The control device of claim 1, wherein one of the input ports is configured to couple to a source for video streams.

3. The control device of claim 2, wherein the source for video streams is a broadcast head end of a cable television network, and wherein one of the display options is television content.

4. The control device of claim 2, wherein the source for video streams is a broadcast head end of a satellite television network, and wherein one of the display options is television content.

5. The control device of claim 1, wherein one of the input ports is configured to couple to a computer network.

6. The control device of claim 5, wherein the computer network is the Internet, and wherein one of the display options is Internet content.

7. The control device of claim 5, further comprising a modem coupled to one of the input ports.

8. The control device of claim 1, wherein one of the input ports is configured to couple to a storage device, and wherein one of the display options is pre-recorded video content.

9. The control device of claim 1, wherein one of the input ports is configured to receive control signals corresponding to a viewer input.

10. The control device of claim 1, wherein one of the input ports is configured to couple to a personal video recorder, and wherein one of the display options is video content pre-recorded on the personal video recorder.

11. The control device of claim 1, further comprising a preference engine coupled to the image generator and at least one of the input ports, the preference engine configured to monitor the display content received by an input port.

12. The control device of claim 11, wherein the preference engine is further configured to generate viewing profiles for a plurality of viewers, each viewing profile including viewing preferences, viewing days and viewing times.

13. The control device of claim 12, wherein the image generator generates a portal image by predicting one of the viewers based on the day and time of the day.

14. A method of controlling a video display, comprising:

determining available sources for display content;

determining a plurality of display options based upon viewer preferences; and generating a portal image to be displayed on the video display as a personalized portal screen, the personalized portal screen comprising the display options, each display option corresponding to one of the available sources or content from one of the available sources, the display options including viewports that display content from selected sources for display content, the display options further including links to other sources.

* * * * *